Sept. 29, 1970  J. H. GASSLER  3,531,795
BAR-TYPE DISPLAY

Filed Sept. 20, 1967  3 Sheets-Sheet 1

INVENTOR
JOHN H. GASSLER
BY
ATTORNEY

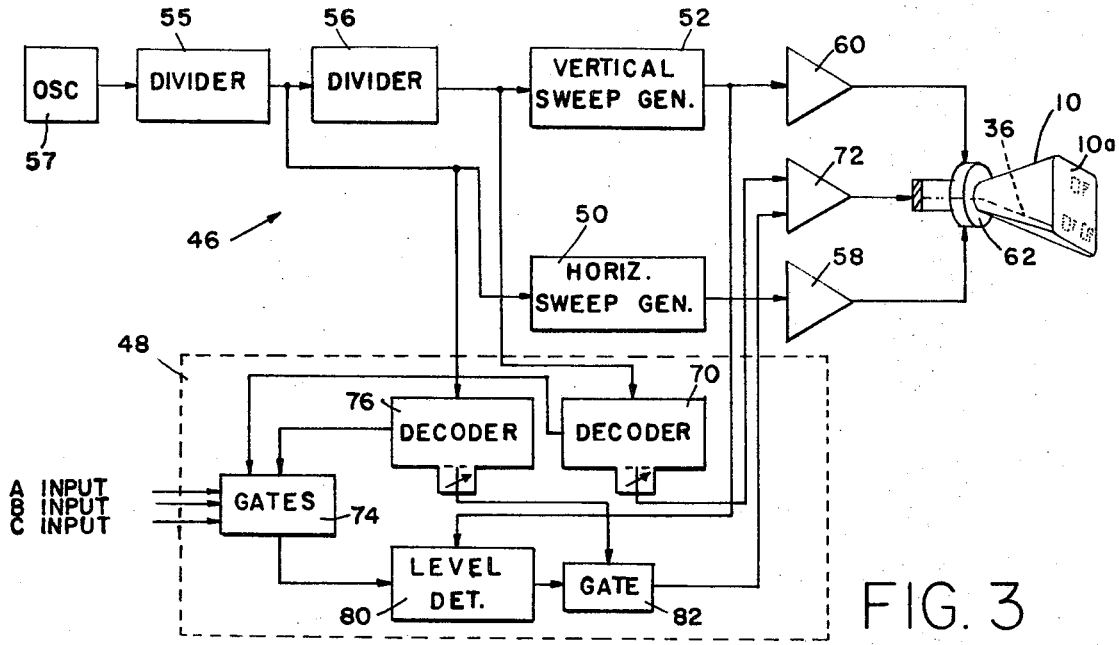
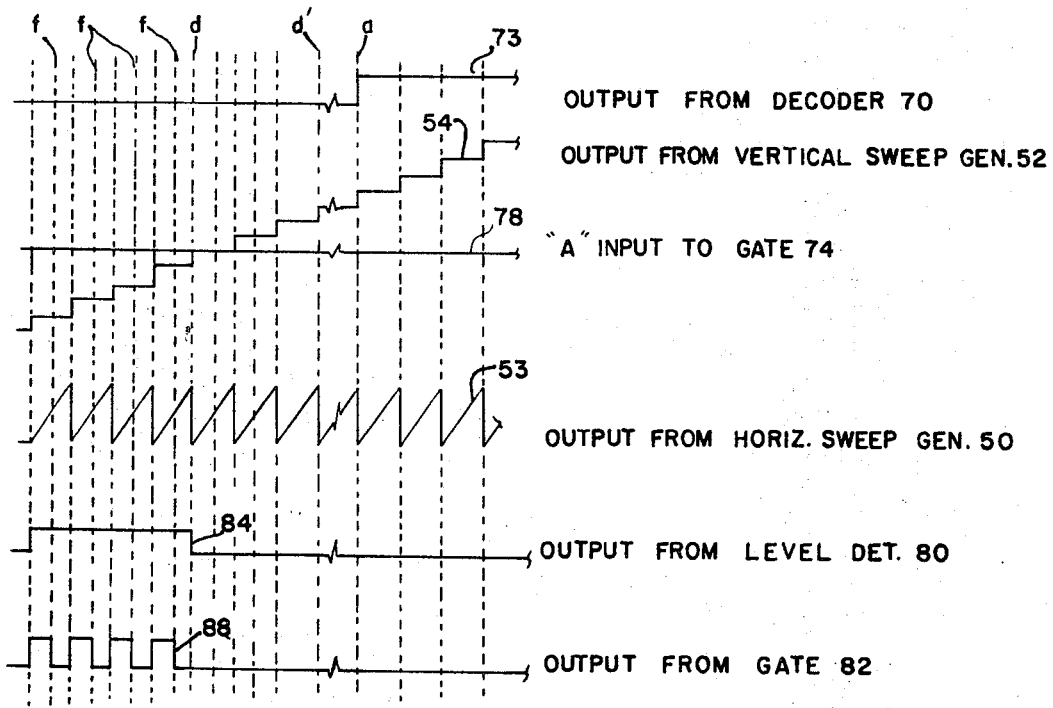
FIG. 4

Sept. 29, 1970        J. H. GASSLER        3,531,795
BAR-TYPE DISPLAY
Filed Sept. 20, 1967        3 Sheets-Sheet 3
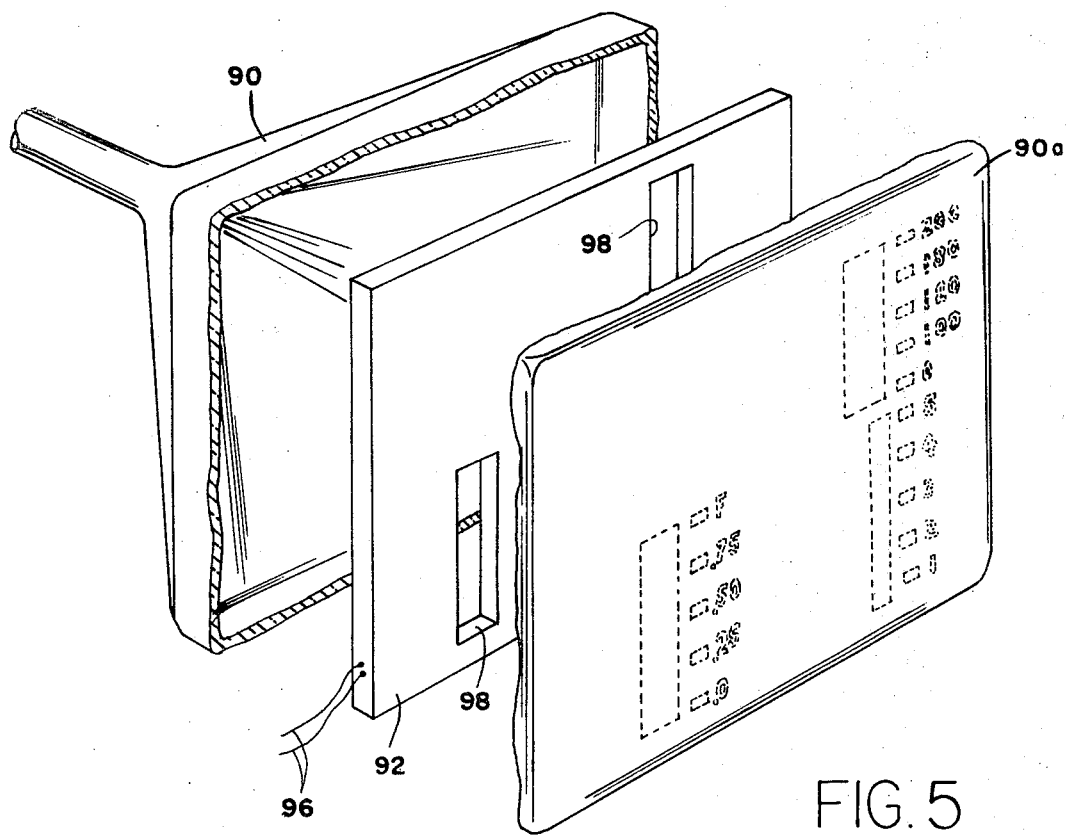
FIG. 5
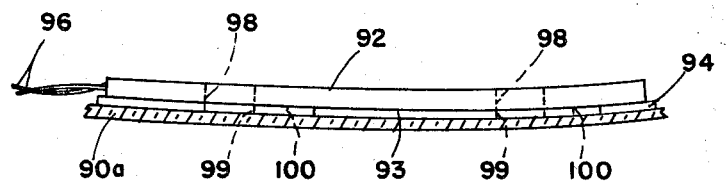
FIG. 6
INVENTOR
JOHN H. GASSLER
ATTORNEY

United States Patent Office 3,531,795
Patented Sept. 29, 1970

3,531,795
BAR-TYPE DISPLAY
John H. Gassler, Nashua, N.H., assignor to Sanders Associates, Inc., Nashua, N.H., a corporation of Delaware
Filed Sept. 20, 1967, Ser. No. 669,182
Int. Cl. H01j 31/08
U.S. Cl. 340—324                                14 Claims

ABSTRACT OF THE DISCLOSURE

An opaque mask is applied to a cathode ray tube screen. Portions of the mask are removed to form shaped windows defining a fixed set of bar indicators with number scales and a phosphor coating is applied to the exposed screen portions. A sweep system associated with the tube develops deflection fields to move its electron beam through a raster-like scan. An associated intensity control system turns the beam off at appropriate times so that it only scans those windows corresponding to selected indicators from the set. Also, the latter system responds to signals representing the parameters chosen for indication so that their present values are displayed as graphs by the selected indicators.

BACKGROUND OF THE INVENTION (a) Field of the invention

This invention relates to the electronic display of information on a cathode ray tube screen or other equivalent display surface. It relates more particularly to a system for displaying scales, grids and other symbols which do not change in a cathode ray tube presentation, as well as moving bar indicators, moving tape indicators, pointers, and the like which combine with the fixed scales to provide graph-like presentations. In its broadest aspect, it pertains to a system for displaying selected data from a fixed set of data in an electronic display.

The present system has application in many situations which require display of the value of a varying parameter in graphic form, i.e. by means of a moving bar or pointer type of presentation. For example, it may be used to provide an aircraft cockpit display of altitude, temperature, reserve fuel, or other such changing data which is measured with respect to a fixed scale.

(b) Description of the prior art

Conventional moving bar indicator display systems may be divided into two general types. First, there are those that rely on servo-driven tapes and pointers or other mechanical and electromechanical devices to provide the proper indication. Generally, these systems are not reliable enough for many present day applications. Moreover, they are rather large and weighty and thus are inappropriate for use in some aero-space applications. Also, they have a fairly high power consumption which places them at a further disadvantage.

The second type of display system generates all of the bars, lines and characters on a cathode ray tube screen using a complex character generator. Therefore, it requires a relatively elaborate high speed deflection system in order to generate all of the strokes of the electron beam needed to trace out the various parts of each character. The requirement for a high speed beam deflection not only makes the overall system quite expensive, it also greatly increases its power consumption. Further, if the system is to display a fairly complex set of characters composed of many strokes, it must trace at such a high rate that the resulting display may not be as bright as might be desired.

SUMMARY OF THE INVENTION

Accordingly, this invention aims to provide an all electronic display system for providing a sharp, distinct and accurate presentation of moving bar indicators, pointers and the like.

Another object of the invention is to provide a simple and relatively inexpensive bar indicator display system.

A further object of the invention is to provide a system capable of producing a high speed display of complex fixed scales and characters as well as moving bars.

A still further object of the invention is to provide a reliable bar indicator display system which has a relatively simple deflection system requiring relatively low power.

A stll further object of the invention is to provide a bar indicator type display system which is relatively small and lightweight and therefore suitable for applications where these factors are important.

Other objects of the invention will in part be obvious and will in part appear hereinafter.

The invention accordingly comprises the features of construction, combination of elements and arrangement of parts which will be exemplified in the constructions hereinafter set forth, and the scope of the invention will be indicated in the claims.

Briefly, the present system includes a special cathode ray tube having an opaque mask applied to its display screen. Portions of the mask are removed to form shaped windows defining a set of bars, lines, characters and other symbols and the usual phosphor coating is applied to the unmasked portions of the tube screen. An associated deflection system generates the requisite deflection fields to move the tube's electron beam through a raster-type scan. When the beam is turned on, it illuminates the phosphor coating at the unmasked portions of the screen as it sweeps. The screen then displays the symbols corresponding to these portions.

An intensity control system operates in synchronsm wth the sweep system and blanks the cathode ray tube so that only selected ones of the bars, lines and characters from the fixed set of such figures are actually displayed at any one time. The intensity control system also blanks the tube in response to input signals corresponding to the values of the parameters to be displayed so that the screen displays bar graphs of these values. These graphs appear as expandable bars or lines juxaposed with fixed scales. The values are shown by the positions of the ends of the bars on their scales.

In a preferred embodiment of the invention, the scales and other fixed elements of the character set inscribed in the mask are illuminated by an electroluminescent lamp positioned behind the mask. The lamp has openings therethrough in register with the windows in the mask corresponding to the bars or other portions of the display that vary in response to variations in the values of the parameters to be displayed on the screen. Consequently, the phosphor coating in those windows is still illuminated by the electron beam as described above.

DESCRIPTION OF THE DRAWINGS

For a fuller understanding of the nature and objects of the invention, reference should be had to the following detailed description taken in connection with the accompanying drawings, in which:

FIG. 3 is a block diagram showing the various elements of the display system;

FIG. 4 shows voltage waveforms associated with the FIG. 3 system;

FIG. 5 is an exploded perspective view of a modified form of cathode ray tube used in the system; and FIG. 6 is a sectional view of the FIG. 5 tube.

DESCRIPTION OF THE PREFERRED EMBODIMENTS

Figure 1:
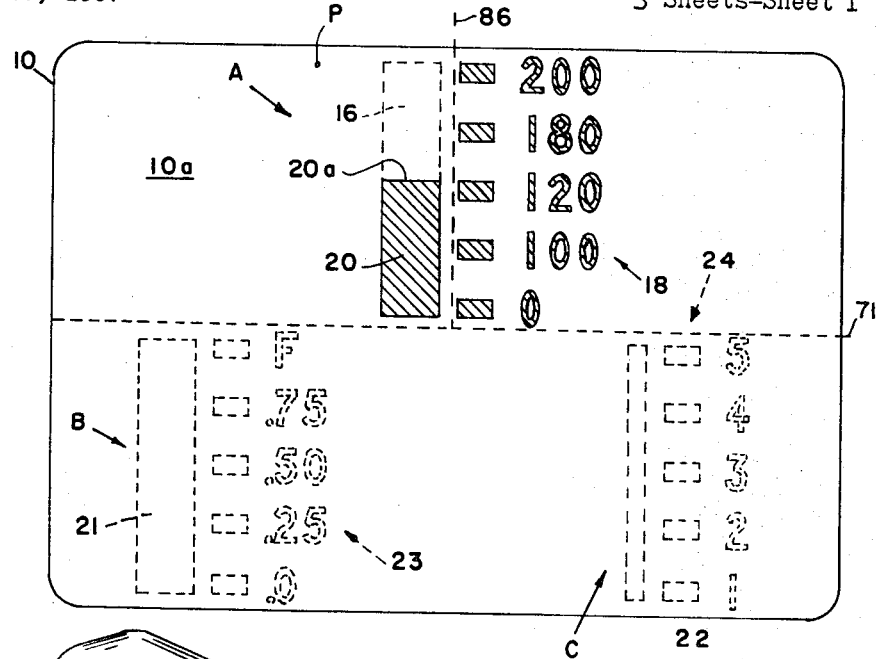
FIG. 1 is a front elevational view of a cathode ray tube made in accordance with this invention.

Referring now to FIG. 1 to the drawings, the illustrated system is adapted to display three bar graphs or indicators, including both the expandable, parameter representing bars and the scale characters associated therewith. The display is presented on the screen 10a of a cathode ray tube 10. The characters on screen 10a which are actually being displayed are shaded. The rest of the elements which the system is capable of displaying are shown in dotted lines. These dotted line elements, while latent, are not visible to the observer. For ease of illustration, I have shown the present system as capable of displaying only three bar indicators A, B and C, the first occupying the upper half of screen 10a; the last two the lower half thereof. In actual practice, however, the presentation might be much more complex. Any one or all of indicators A-C may be displayed at one time. For purposes of illustration, we have selected only bar indicator A for display.

Indicator A includes a bar field 16 and associated scale 18. Field 16 represents the area within which a bar 20 can vertically expand or contract. Scale 18 includes scale markers and a set of numbers which are appropirate for the parameter being measured. We will assume, for example, that scale 18 indicates temperature. The particular scale reading opposite the top 20a of bar 20 constitutes the measured value of the parameter, i.e. a temperature of 120°. Thus, the indication given by bar indicator A is similar to that provided by a conventional thermometer.

Bar indicators B and C are similar to indicator A. They have fields 21 and 22 respectively and associated scales 23 and 24 respectively. Since, for purposes of discussion, no parts of indicators B and C are being displayed, they are shown in dotted line and no bars appear in their fields 21 and 22.

Figure 2:
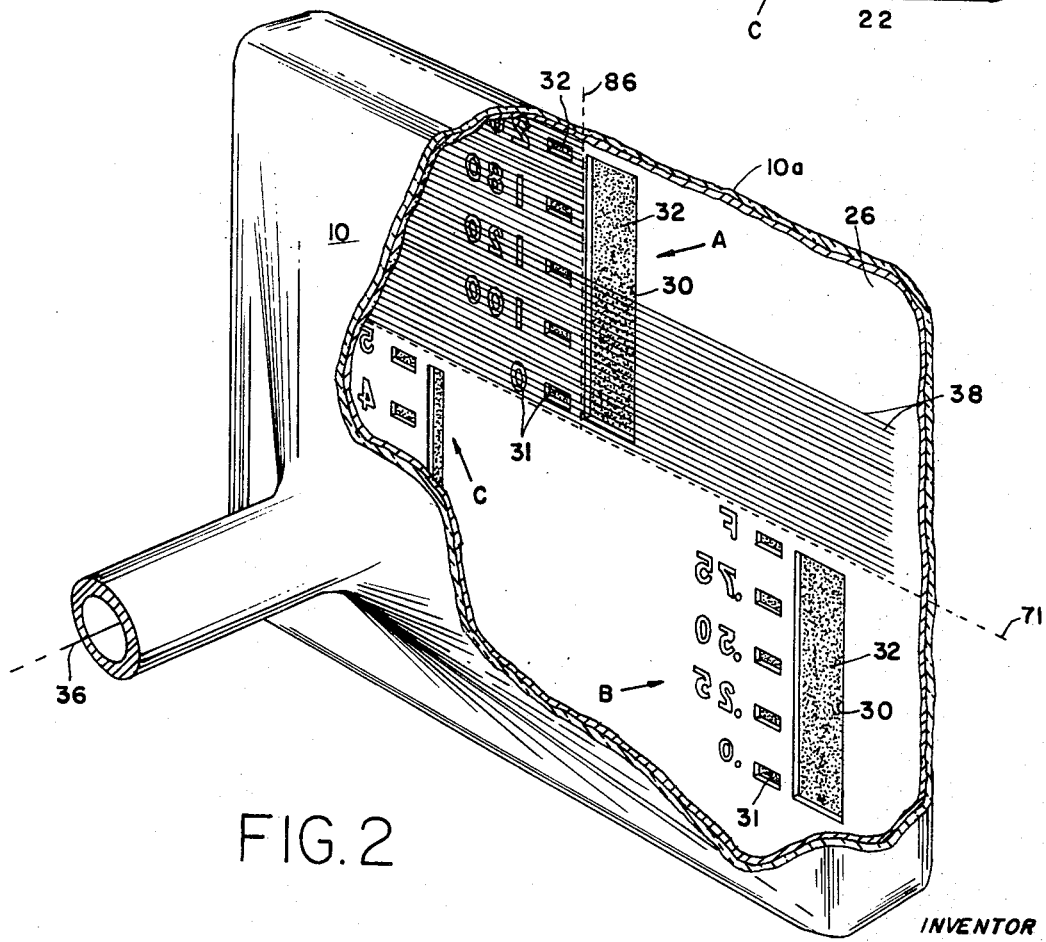
FIG. 2 is a perspective view, with parts cut away, of the FIG. 1 tube.

Referring now to FIG. 2, tube 10 is similar to a conventional cathode ray tube. It differs in that a mask 26 is applied to the inside face of screen 10a. Preferably this is done prior to coating the latter with phosphor. Mask 26 comprises preferably a suitable deposit of opaque paint. Normally, this would be a very thin deposit. However, for purposes of clarity, we have exaggerated its thickness.

Portions of mask 26 are removed from screen 20a to form windows 30 and 31 through the mask. Windows 30 are shaped to correspond to fields 16, 21 and 22 in FIG. 1, while windows 31 are shaped to correspond to the elements of scales 18, 23 and 24. A standard phosphor coating 32 is then deposited at least on the unmasked portions of screen 10a, i.e. the portions thereof exposed by windows 30 and 31. However, no harm is done if phosphor is also applied to the entire mask 26. Since it is an opaque mask, coating 32 may even be applied prior to depositing mask 26 on screen 10a as long as care is taken not to remove or damage the coating when forming windows 30 and 31. In other respects, tube 10 is the same as conventional cathode ray tubes.

Tube 10 is associated with a sweep system to be described presently which develops the requisite deflection field to move an electron beam 36 therein through a typical raster-type scan commencing at the upper left-hand corner of screen 10a (FIG. 1). Some scan lines 38 of the raster are shown in FIG. 2. When electron beam 36 is turned on and sweeps back and forth, it impinges upon the phosphor coating 32 at windows 30 and 31, causing it to glow. Consequently, screen 10a displays illuminated lines and characters defined by the windows which have been scanned by beam 36. Of course, when electron beam 36 impinges on mask 26, it has no visible effect on screen 10a.

Now referring to FIG. 3 of the drawings, a conventional sweep system indicated generally at 46 generates the raster scan lines 38 (FIG. 2) in tube 10. Sweep system 46 comprises a horizontal sweep generator 50 and vertical sweep generator 52, each of which generates a linearly increasing voltage having a stepped waveform. These waveforms are indicated by the curves 53 and 54, respectively, in FIG. 4. Generators 50 and 52 are appropriately controlled by signals from dividers 55 and 56, respectively, which count cycles in the output of an oscillator 57. The outputs of generators 50 and 52 are applied via amplifiers 58 and 60, respectively, to the horizontal and vertical sections of a beam deflection yoke 62 associated with tube 10. Of course, if desirable, the beam could be deflected in other ways, for example, by electrostatic deflection.

Generators 50 and 52 are conventional digital-to-analog converters which respond to the counts in dividers 55 and 56, respectively. As the count in divider 55 increases, the output voltage from generator 50 gradually increases as seen in FIG. 4. This, in turn, gives rise to a horizontal deflection field which moves beam 36 across the tube screen 10a, forming a horizontal scan line 38 (FIG. 2). Similarly, as the count in divider 56 increases, the output from generator 52 increases as seen in FIG. 4 and steps beam 36 down so that it is in position to form successively lower scan lines 38 (FIG. 2).

It is apparent, therefore, that the count in divider 55 corresponds to a unique horizontal deflection of beam 36 while the count in divider 56 corresponds to a unique vertical beam deflection. Taken together, the two counts define the point where beam 36 impinges screen 10a, assuming it is turned on.

A beam intensity control system 48 then turns electron beam 36 on and off as the deflection fields are developed by system 46 so that screen 10a displays the proper parameter values on the selected indicators. Thus, control system 48 performs two functions. First, it selects for display a particular indicator or indicators from the complete set of indicators which the system is capable of displaying. It does this by blanking tube 10 when beam 36 impinges on the phosphor coating 32 in those windows 30 and 31 defining information which is not to be displayed, e.g. bar indicators B and C in the present example. Second, by a similar selective blanking process, system 48 controls the level or value to be shown on each bar graph selected for display, e.g. the elevation of top 20a of bar 20 in indicator A (FIG. 1).

More particularly, system 48 includes a conventional decoder 70 which may be adjusted to sense a particular count in divider 56. In response thereto, decoder 70 emits blanking signals by way of a summing amplifier 72 to the intensity control of tube 10 so that the tube displays only selected symbols from the fixed set defined by mask 26. The arrow on decoder 70 indicates that the decoder is adjustable so that it will emit signals to amplifier 70 when it contains the count corresponding to the selected symbol. Since the divider 56 count corresponds to a determined vertical deflection of beam 36, during a given count, electron beam 36 (assuming it is turned on) impinges on mask 26 (or phosphor coating 32) at a determined vertical position thereon. Thus, by responding to selected counts from divider 56, decoder 70 turns tube 10 on and off at the appropriate times so that beam 36 illuminates only those windows 30 and 31 defining the bars and scales selected for display.

Thus, in the present example, screen 10a is blanked below a horizontal dashed line 71 located just below indicator A. Assume that a count "a" (FIG. 4) in divider 56 corresponds to the particular horizontal scan line 38 coinciding with line 71. Therefore, decoder 70 is set to respond to the "a" count. Upon the occurrence thereof, decoder 70 applies a blanking signal to tube 10. The waveform of this blanking signal is indicated by the curve 73 in FIG. 4. As seen from this curve, the blanking signal persists until the end of the sweep cycle. Thus, beam 36 does not scan any point below line 71 (FIG. 2) and, therefore, the entire lower half of screen 10a remains dark as indicated in FIG. 1, i.e. the tube is blanked during the entire lower portion.

On the other hand, when bar indicator B or C is selected for display, decoder 70 is set to respond to the divider 56 count which causes it to emit blanking signals during those times when beam 36 is scanning above line 71.

Referring to FIGS. 3 and 4, the parameter values being displayed by the moving bar elements of this system are applied as analog voltages or discrete digital values to section 48 by way of a set of gates 74 which includes an internal decoder. In the illustrated embodiment, these inputs are shown as inputs A, B and C, the letter designations corresponding to the bar indicators on which they are shown. In a typical system, however, there might be many more than three such inputs to these gates. Gates 74 are enabled selectively by signals from decoder 70 and a second decoder 76 so as to apply the appropriate input signal when a particular indicator is selected for display.

Decoder 76, like decoder 70, is a conventional logic matrix composed of AND and OR gates or other similar logic gates which senses particular counts in divider 55. As mentioned above, a given count in the latter corresponds to a definite horizontal deflection of the electron beam. Decoders 70 and 76 detect counts from dividers 56 and 55 respectively corresponding to a positioning of beam 36 at a point just to the left of each indicator selected for display. Thus, when a given indicator is to be shown, decoders 70 and 76 apply a pair of signals defining that indicator to gates 74. Thereupon, in response to these signals, gates 74 pass the input corresponding to that indicator, e.g. the A input. Therefore, the presence of the proper input signal is assured when beam 36 is scanning the window 30 of the indicator in question.

Thus, referring to FIGS. 1 and 3, for display of indicator A, decoders 70 and 76 detect counts corresponding to a beam 36 (FIG. 2) position at a point P to the left of the top of field 16. Signals from the decoders then enable gates 74 so that the gates pass the A input signal at that time. The waveform of the A input signal is shown by curve 78 in FIG. 4. It persists at least for the time it takes beam 36 (FIG. 2) to scan window 30 in indicator A.

The output of gates 74 is applied to a level detector 80 which also receives output signals from vertical sweep generator 52. Detector 80 compares the A input voltage with that of the signal from vertical sweep generator 52. As long as the generator 52 signal voltage is less than the A input voltage, detector 80 emits a D.C. blanking signal by way of a normally enabled gate 82 to summing amplifier 72. As long as gate 82 is enabled, this signal turns off the beam in tube 10.

In the present example, and with reference to FIGS. 3 and 4, the voltage of the output signal from generator 52 is less than the A input voltage during the interval from the beginning of the sweep cycle until the occurrence of the "d" count. Consequently, during this time interval, detector 80 emits a blanking signal as seen from the curve 84 in FIG. 4. From this point on, the output voltage of sweep generator 52 exceeds the A input voltage so that the signal from detector 80 drops to zero volts for the remainder of the sweep cycle.

As shown in FIG. 4, during the interval between the "d" and "a" counts, no blanking voltage is applied to tube 10. Therefore, electron beam 36 in tube 10 sweeps back and forth forming the full length raster scan-lines 38 shown in FIG. 2. The phosphor coating 32 in window 30 underlying scan lines 38 is illuminated so that bar 20 is displayed on screen 10a (FIG. 1). The top scan line 38 in this band coincides with the "d" count and therefore it defines or determines the location of the top 20a of bar 20 (FIG. 1).

As the A input signal changes, this is reflected in a shift in the point where waveform 54 crosses waveform 78. Consequently, there is a corresponding shift in the height or level of moving bar 20. For example, if the crossing should occur at a later count, say, d', the electron beam 36 would commence scanning further down on window 30, e.g. at the location of the third scan line 38 in FIG. 2. Accordingly, the top 20a of bar 20 would be lowered by the same amount.

Referring now to FIGS. 2-4, if the signal from detector 80 were applied directly to the intensity control of tube 10 for the entire "d" count, those portions of scale 18 above bar 20 would not appear in the display. This is because the detector 80 signal would blank tube 10 across the full width of screen 10a. However, it is often desirable to display in its entirety the fixed portions of the selected indicator, e.g. scale 18 (FIG. 1), no matter what the level of the bar is. Consequently, decoder 76 is adjustable as indicated by the arrow in FIG. 3. It is set to respond to selected counts in divider 55 so as to apply disabling signals to gate 82 and thereby interrupt the blanking signals from detector 80 whenever electron beam 36 is scanning windows 31 (FIG. 2).

Also, decoder 76 is set to apply disabling signals to gate 82 at the appropriate times to blank tube 10 when beam 36 is scanning windows 30 and 31 of other indicators to the left or right of the selected one.

In the present example, decoder 76 detects an "f" count in divider 55 which corresponds to those points in each horizontal sweep defined by a dashed line 86 (FIG. 1) midway between field 16 and scale 18. Decoder 76 then emits disabling signals to gate 82 which interrupt the blanking signal applied by detector 80. Thus, the output signal from gate 82 has the waveform illustrated by the curve 88 in FIG. 4. As seen from curve 86, during the interval between the beginning of the sweep cycle and the "d" count, the blanking signal applied by gate 82 to amplifier 72 exists during the first portion of each horizontal sweep of beam 36. At the "f" count, it then drops to zero for the remainder of each horizontal sweep.

Consequently, during the time period corresponding to the portion of each horizontal sweep to the left of line 86, tube 10 is blanked so that there is no visible display of the dotted line portion of field 16 shown in FIG. 1. During the remainder of each horizontal sweep, however, tube 10 is unblanked so that the scale 18 markings and numerals to the right of line 86 are displayed.

Since there are no other indicators on either side of indicator A, gate 82 is not otherwise disabled. If, however, indicator C had been selected, decoder 76 would apply disabling signals to gate 82 at those times during each horizontal sweep of beam 36 when it scans windows 30 and 31 in indicator B and also when it scans window 31 in indicator C.

FIGS. 5 and 6 show a cathode ray tube 90 further modified for use in the present system. Tube 90 provides a permanent visible display of all of the fixed elements such as scales, grids, etc. without using beam 36. Accordingly, its use avoids the necessity for modulating the signal from level detector 80 (FIG. 3) described above.

Tube 90 is the same as tube 10 (FIG. 1) except that an electroluminescent lamp 92 overlies a mask 93 at the inside of screen 90a. Lamp 92 is actually bonded to the mask 93 and its electrical leads 96 are led out through the gun end of tube 90. Mask 93 is identical to mask 26 so that tube 90 is capable of producing the same display as tube 10 (FIG. 1).

Openings 98 are provided in lamp 92 in register with the windows 99 in mask 93 which define the variable portions of the display. There are no openings in lamp 92 opposite windows 100 in mask 93 defining the fixed scale markings. Therefore, when lamp 92 is illuminated and the system is in operation, the lamp itself illuminates the fixed portions of the display, i.e. the scale designations and numbers, while the electron beam in tube 90 shines through one or the other of openings 98 and illuminates the moving bar portions thereof as described above.

Of course, lamp 92 may, be segmented so that the portions thereof associated with different indicators may be separately controlled. In this even the segment corresponding to the selected indicator can be turned on at the right time by signals from decoders 70 and 76 (FIG. 3) as was done with gate 74. Thus, only the scale of the selected indicator would be visible.

The present system is also able to display horizontal bar graphs. This simply involves orienting the various windows in mask 26 horizontally and rearranging the numerals accordingly. Also, in the case of horizontal bars, the roles of decoders 70 and 76 are reversed.

Even more elaborate pointer and other type displays are feasible with the basic system described herein. This simply involves use of decoders with more logic elements to provide the necessary timed blanking signals for tuning the electron beam on and off at the appropriate times to blank out unwanted portions of the available symbols. The decoder logic for accomplishing this is conventional.

Also, in the illustrated system, means for providing a fixed vertical deflection offset to amplifier 60 can be used in lieu of decoder 70 to blank out the unwanted half of tube 10. This offset would prevent electron beam 36 from sweeping below or above line 71 (FIG. 2), depending upon which bar indicator A or B and C is to be displayed. Blanking system 48 would then only have to turn off beam 36 at the appropriate times in each of its horizontal sweeps across the tube.

It is seen from the foregoing, then, that my bar indicator display system produces a fast display of characters, indicators, scales, and the like.

Also, the number and complexity of the fixed characters and lines capable of being displayed by the system is limited only by one's ability to inscribe them in mask 26. The displayed bars and characters are sharp and distinct since they are well-defined by the edges of mask 26 in the horizontal direction and by a horizontal scan line 38 in the vertical direction. Also, since the characters are formed right adjacent screen 10a, there is no distortion thereof due to parallax.

The system is advantaged also because it only has to generate a simple raster-type scan to display even the most complext scales and chambers. Therefore, its deflection system is itself quite simple and economical, both in terms of cost and power consumption. In addition, the electron beam moves at a relatively slow rate as compared with conventional character generators which trace out each figure. Therefore, the present system is able to produce a bright, readable visual presentation of uniform tone and intensity.

It will thus be seen that the objects set forth above, among those made apparent from the preceding description, are efficiency attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A display system comprising
   (A) a cathode ray tube (10) having
       (1) a display screen (10a); and
       (2) means for generating an electron beam (36) for impinging thereon;
   (B) means (26) for masking selected areas of said screen so as to define a set of symbols thereon;
   (C) a phosphorescent coating (32) in said tube, said coating covering at least the unmasked areas of said screen;
   (D) means (46) for deflecting said beam so that it sweeps in a raster-like scan over said masked screen; and
   (E) means (48) for blanking said tube selectively so that said beam impinges said coating only in selected ones of said unmasked screen areas whereby only selected symbols from said set are made visible on said screen.

2. A display system as defined in claim 1 wherein said blanking means includes
   (A) means (70) for detecting the vertical position of said beam; and
   (B) means (76) for detecting the horizontal position of said beam, both of said detecting means emitting signals for blanking said tube except when said beam is positioned at said selected ones of said screen areas.

3. A display system as defined in claim 1 wherein said blanking means includes
   (A) means (80) responsive to input signals representing moving parameter values for blanking said tube so that said beam impinges only on certain portions of said selected screen areas representative of said values, whereby said portions provide a graphical display of said parameter values.

4. A display system as defined in claim 3 and further including means (48, 92) in said tube for illuminating other portions of said selected screen areas so as to provide fixed scale references for said graphical display.

5. A display system as defined in claim 3 wherein said responsive means includes means (80) for comparing the voltage of the input signals with the voltage of a signal from said deflecting means, said comparing means emitting blanking signals to said tube when the voltage of the latter signal and the voltage of the former signal equal a selected ratio.

6. A display system as defined in claim 4 wherein said illuminating means comprises an electroluminescent lamp (92).

7. A display system comprising
   (A) a cathode ray tube (10) having a display screen (10a);
   (B) means (26) for masking selected portions of said screen so as to define at least one expandable bar and associated fixed scale;
   (C) a phosphorescent coating (32) in said tube, said coating covering at least the unmasked portions of said screen;
   (D) a sweep system (46) for deflecting the electron beam generated in said tube so that it scans said unmasked screen portions; and
   (E) a beam intensity control system (48) responsive to input signals representing a moving parameter value to be displayed graphically on said screen, said control system emitting control signals to said tube so that its electron beam scans only a selected part of the expandable bar-defining portions of said screen, said selected part defining said value on said scale.

8. A display system as defined in claim 7 wherein said control system includes means for selectively blanking said tube so that only said selected one bar and associated scale are displayed on said screen.

9. A display system as defined in claim 7 and further including one or more electroluminescent lamps (92) positioned in said tube opposite the scale-defining portions of said screen.

10. A display system as defined in claim 7 wherein said control system includes also
    (A) a set of gates (74) to which said input signals are applied; and
    (B) means (70, 76) for detecting the position of said beam, said detecting means enabling a selected one of said gates when said beam is scanning the expandable bar-defining portions of said screen corresponding to a selected input signal.

11. A display system as defined in claim 10 wherein said control means further includes means (80) for comparing the signal from said gates with a signal from one of said detecting means, said comparing means emitting control signals to said tube when the signal level from said detecting means bears a selected ratio to the level of said input signal.

12. A display system as defined in claim 11 wherein said control means also includes means (82) for modulating said control signal in response to signals from the other of said detecting means so as to unblank said tube when said beam is scanning said fixed scale-defining portion of said screen.

13. A display system comprising
(A) a cathode ray tube (10) having a display screen (10a), an associated vertical and horizontal deflection yoke (62) and means for generating an electron beam (36) therein;
(B) means (26) for masking selected portions of said screen so as to define a set of expandable bars and associated fixed scales;
(C) a phosphorescent coating (32) in said tube, said coating covering at least the unmasked portions of said screen;
(D) an oscillator (57);
(E) a horizontal sweep generator (50) for driving the horizontal component of said yoke;
(F) a first divider (55)
  (1) responding to signals from said oscillator; and
  (2) controlling said horizontal sweep generator, the count in said first divider corresponding to the horizontal position of the electron beam on said screen;
(G) a vertical sweep generator (52) for driving the vertical component of said yoke;
(H) a second divider (56)
  (1) responding to signals from said first divider; and
  (2) controlling said vertical sweep generator, the count in said second divider corresponding to the vertical position of said beam on said screen;
(I) a beam intensity control system (48), said system comprising
  (1) a first decoder (70)
    (a) responsive to the count in said second divider; and
    (b) adjustable to emit control signals to said tube when said second divider contains selected counts so that said beam impinges said coating only in selected ones of the unmasked screen portions corresponding to selected bars and associated scales from said set;
  (2) a second decoder (76) responsive to the count in said first divider;
  (3) a set of gates (74) to which input signals are applied, signals from said decoders enabling the gate corresponding to each selected input signal when said beam is scanning the bar defining portion of said screen corresponding to the selected signal;
  (4) a level detector (80)
    (a) comparing the output signal from said vertical sweep generator with the signal from said set of gates; and
    (b) emitting control signals to said tube so as to unblank said tube when said selected input signal and said vertical sweep generator signal equal a selected ratio so as to illuminate an area of the bar defining portion of said screen indicative of the selected input signal; and
  (5) a gate (82)
    (a) connected between said level detector and said tube; and
    (b) operative in response to signals from said second decoder to interrupt said control signals from said detector when said beam is scanning the fixed scale-defining portion of said screen corresponding to the selected signal.

14. A display system as defined in claim 13 and further including an electroluminescent lamp (92) positioned in said tube opposite the scale defining portions of said screen.

References Cited

UNITED STATES PATENTS

| | | | |
|---|---|---|---|
| 2,316,550 | 4/1943 | Bigalke. | |
| 2,595,646 | 5/1952 | Doba et al. | 315—22 X |
| 2,597,677 | 5/1952 | Schroeder | 313—89 |
| 3,087,085 | 4/1963 | Turner | 313—92 |
| 3,276,008 | 9/1966 | Hauerbach | 340—324 |
| 3,336,498 | 8/1967 | Castanera | 340—324 X |
| 3,343,030 | 9/1967 | Dragon et al. | 315—22 |
| 3,395,305 | 7/1968 | Yaggy | 313—92 |

DONALD J. YUSKO, Primary Examiner

D. L. TRAFTON, Assistant Examiner

U.S. Cl. X.R.

178—7.83; 313—89; 315—22